United States Patent
Walraet

(10) Patent No.: US 7,555,943 B2
(45) Date of Patent: Jul. 7, 2009

(54) DEVICE FOR DETECTING A LEAK OR UNDERINFLATION IN THE TIRES OF MOTOR VEHICLE WHEELS

(75) Inventor: David Walraet, Saint-Germain En Laye (FR)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 10/573,663

(22) PCT Filed: Sep. 29, 2004

(86) PCT No.: PCT/FR2004/002458

§ 371 (c)(1), (2), (4) Date: Feb. 15, 2007

(87) PCT Pub. No.: WO2005/032857

PCT Pub. Date: Apr. 14, 2005

(65) Prior Publication Data

US 2007/0220965 A1   Sep. 27, 2007

(30) Foreign Application Priority Data

Sep. 30, 2003  (FR)  .................................. 03 11439

(51) Int. Cl.
*B60C 23/02* (2006.01)
(52) U.S. Cl. ...................................................... 73/146.5
(58) Field of Classification Search .................. 73/146, 73/146.5
See application file for complete search history.

(56) References Cited

U.S. PATENT DOCUMENTS

| 2,861,774 A | | 11/1958 | Buchi |
| 5,441,383 A | | 8/1995 | Dale et al. |
| 5,895,846 A | * | 4/1999 | Chamussy et al. ......... 73/146.2 |
| 6,533,010 B1 | * | 3/2003 | Alonso et al. ............... 152/419 |
| 2003/0074961 A1 | | 4/2003 | Fischer et al. |

FOREIGN PATENT DOCUMENTS

| DE | 4242494 | 9/2003 |
| DE | 10212675 | 10/2003 |

OTHER PUBLICATIONS

Search Report for International Application PCT/FR2004/002458, mailing date Apr. 13, 2005; 2 pgs.

* cited by examiner

*Primary Examiner*—Andre J Allen
(74) *Attorney, Agent, or Firm*—Foley & Lardner LLP

(57) ABSTRACT

The device comprises means for measuring the pressure of the gas contained in a tire of a vehicle, means for collecting pressure measurement data and means for calculating the change in pressure between two instants of measurement data collection. The device further includes clocking means for clocking the time of the measurement data collection and for calculating the change in pressure between clocked instants of collection. The device also makes it possible for the pressure measurement to be temperature-compensated.

6 Claims, 1 Drawing Sheet

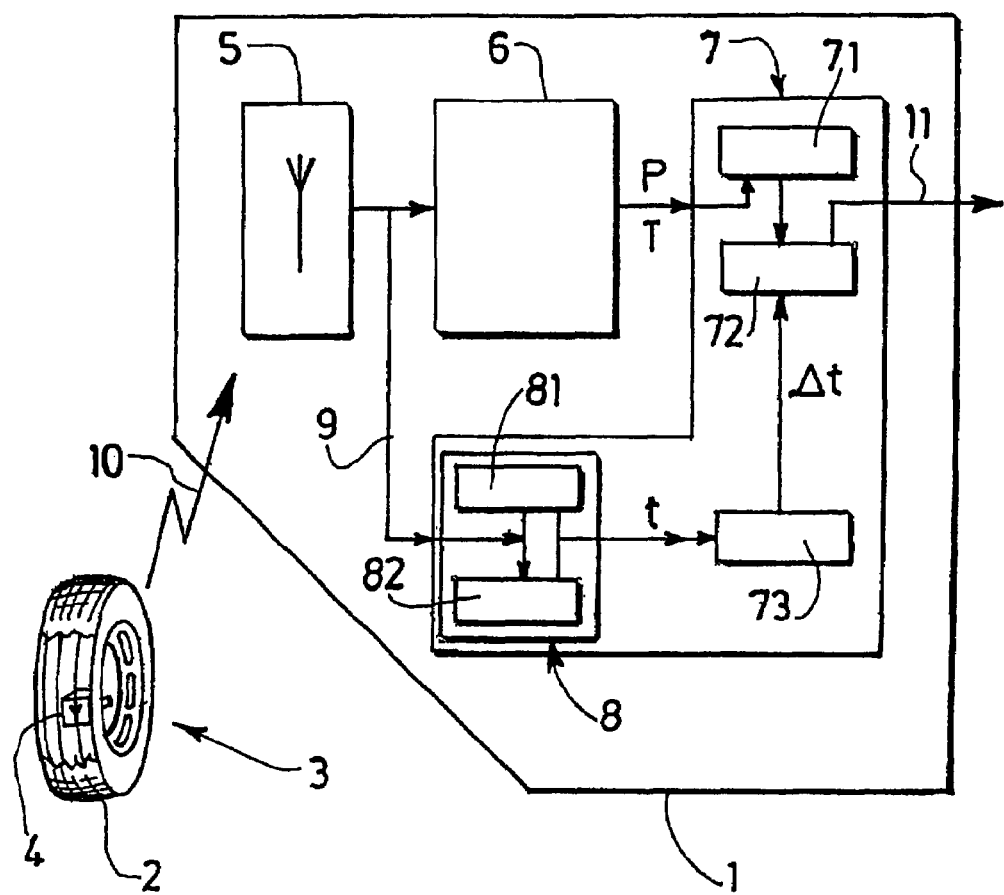

DEVICE FOR DETECTING A LEAK OR UNDERINFLATION IN THE TIRES OF MOTOR VEHICLE WHEELS

BACKGROUND

The invention firstly relates to leakage devices, and especially to devices for detecting the puncturing of tyres of motor vehicle wheels and more precisely to calculating the leakage rate from these tyres.

The detection devices may be integrated into computers in the passenger compartment or more specifically into TPMS (Tyre Pressure Measurement System) modules.

A TPMS module collects the information about the pressure P and temperature T of the gas contained in a tyre by means of sensors and a radio transmitter, these generally being fastened to the rim of the wheel. A radio receiver placed in the module periodically receives a data packet representative of the pressure and temperature.

The period of collection of the data packets from each wheel is, in principle, the inverse of the theoretical frequency with which the data packets are transmitted by the transmitters, which is determined by the passenger compartment computer according to the operating state of the vehicle (at rest or running).

To detect a leak, its leakage rate may be calculated from the change in the pressure, from one data packet to another, at the above theoretical frequency, that is to say the leakage rate is calculated from the pressure difference recorded over the theoretical time.

However, this detection is not ideal.

Firstly, the temperature of the rim, and therefore of the gas contained in the tyre, may vary substantially, for example during a braking operation. This causes a change in the pressure and a change in the calculated leakage rate that may be interpreted wrongly as a leak. This is because the thermal compensation, even if it is applied, has no immediate effect given the long response time of a temperature sensor, which is longer than that of a pressure sensor.

Secondly, the time between two data packets may not be constant:

1) it may be intentionally reduced, for example if the tyre pressure monitoring requires to be increased, in which case the calculated leakage rate decreases with time between two data packets;
2) it may unintentionally increase in the event of a data packet being lost, caused by a poor radio link. The calculated leakage rate may then double, triple, etc., unbeknown to the TPM module, which therefore cannot apply the slightest correction.

Mathematical algorithms for smoothing temperature and pressure data in order to attenuate the effects of these sources of error are known. However, this solution does not prevent a delay in detecting an actual puncture, or an adventitious detection. This may be prejudicial to the safety of the driver and the passengers of the vehicle.

SUMMARY

The Applicant was set this problem and, to solve it, proposes a device for detecting a leak in a tyre of a motor vehicle wheel, comprising means for measuring the pressure of the gas contained in the tyre, means for collecting pressure measurement data and means for calculating the change in pressure between two instants of measurement data collection, which device is characterized in that it includes means for clocking the time of the measurement data collection and for calculating the change in pressure between clocked instants of collection.

The means for clocking the measurement data collection allow the air leakage rate to be calculated more precisely, whatever the frequency of measurement data collection and whatever the conditions of data packet radio transmission.

The calculating means may be configured to calculate a thermally compensated change in pressure.

DETAILED DESCRIPTION

The invention will be more clearly understood from the following description of one embodiment of the device of the invention and from the single appended FIGURE that shows a functional block diagram of the device.

A device 1, for detecting a leak and more commonly a puncture, of a tyre 2 of a wheel 3 of a motor vehicle (not shown), periodically receives, via a radio link 10, data packets, including the instantaneous pressure P of the gas contained in the tyre and possibly its temperature T. The quantities P and T are measured by sensors (not shown) in a module 4 fastened to the rim or to the valve of the wheel 3, on the inside of the tyre 2. It is the module 4, also equipped with a transmitter (not shown), which transmits the abovementioned data packets.

The detection device 1 comprises means for collecting the measurement data packets from the module 4, a receiver 5 for receiving the radio signals 10 and converting them into analogue electrical signals, and a demodulator 6 that converts these analogue signals into digital signals and then into digital data, including the pressure P and the temperature T of the gas in the tyre.

The device 1 also includes, on the output side of the demodulator 6, calculating means 7, here a microprocessor, for calculating the rate of any leakage from the transmitted data P and T. The calculation of the leakage rate is performed by a module 71, calculation being initiated each time a data pair (P, T) is available at the output of the demodulator 6. A module 72 for detecting a change in pressure delivers puncture or leakage detection information to the user, via the output 11, on the basis of the information delivered by the module 72 and a module 73, on the output side of a module 8, for calculating the time difference between two successive data pairs. The module 8 is a clocking module, which comprises a clock 81 and a memory 82, for clocking the time at which the measurement data is received, this being controlled by the receiver 5 by means of an interrupt system 9. The modules 73 and 8 here are integrated into the microprocessor 7.

The operation of the detection device will now be described.

When the receiver 5 receives a data packet $\Theta_i$ containing the data $P_i$ and $T_i$, it transmits an interrupt signal 9 controlling the clocking module 8. This records, in the memory 82, the instant $t_i$ of the clock 81 corresponding to receipt of the data packet. It then transmits the data packet $\Theta_i$ to the demodulator 6, which extracts the data $(T_i, P_i)$ therefrom and transmits the data to the microprocessor 7. The microprocessor 7, upon receipt of the data pair $(T_i, P_i)$, reads the instant $t_i$ available in the memory 82, already present thanks to the interrupt system 9.

On receiving the next data packet $\Theta_{i+1}$, the microprocessor likewise obtains $(T_{i+1}, P_{i+1})$ and $t_{i+1}$.

The difference calculation module 73 calculates:

$$\Delta t = t_{i+1} - t_i.$$

The leakage rate calculation module 71 calculates:

$$\Delta P = P_{i+1} - P_i.$$

The detection module 72 then calculates the leakage rate via the formula giving the change in pressure:

$$D_P = \Delta P / \Delta t$$

and compares $D_P$ with a puncture or leakage detection threshold $S_p$ above which an alarm is transmitted on the output 11 of the microprocessor 7.

However, the expression $\Delta P / \Delta t$ is, as it were, a rate of change of pressure, whereas what it is desired to obtain is a change in the amount of gas. However, a tyre is not isothermal—it is perfectly possible for there to be a change in pressure without there being a change in the amount of gas. Now, it is just as important to detect a leak when it occurs as to not detect it when it does not. Accordingly, microprocessor 7 may be configured to integrate the temperature into the calculations proposed for alleviating the abovementioned situation.

In the equation:

$$PV = nRT \tag{1}$$

taken into account in the above calculations with, as assumptions, that the inside of the tyre contains a perfect gas mixture and that its internal volume is constant, R is the perfect gas constant and n, representing the number of moles, is also constant if there is no leak.

A detection threshold is supplied by the tyre manufacturer or the vehicle manufacturer. However, such a threshold is supplied for a reference temperature $T_{ref}$.

If it is therefore desired to take this into account, the measured pressure has to be compensated by the temperature and it is necessary to consider, not the measured pressure $P_m$, but the compensated pressure $P_c$, which is related to $P_m$ through Equation (1) and, from the assumptions associated therewith, through Equation (2):

$$\frac{P_m}{T_m} = \frac{P_c}{T_{ref}} \tag{2}$$

in which $T_m$ is the temperature measured inside the tyre at the same time as $P_m$.

This results in Equation (3):

$$P_c = P_m \frac{T_{ref}}{T_m} \tag{3}$$

It is on the basis of the value of $P_c$ that it will be decided, if this is the case, that a threshold has been exceeded and that an alarm has to be transmitted.

However, in Equation (1), the pressure P is an absolute pressure, expressed in pascals or in bar, and likewise T is an absolute temperature, expressed in kelvin.

When the pressure of a tyre is measured, both by the module 4 and at a service station, it is a relative pressure that is measured. When 0 bar is measured, the absolute pressure is in fact 1.014 bar.

Thus, if the measurement temperature is for example 20° C., Equation (3) has to be corrected in order to become Equation (4):

$$P_c = (P_m + 1.014)\frac{T_{ref}}{T_m} - 1.014 \tag{4}$$

in which $P_c$ and $P_m$ are relative pressures, the temperatures $T_{ref}$ and $T_m$ being expressed in kelvin.

Of course, apart from detecting a leak, the considerations developed above also apply just as well to detecting any underinflation of a tyre, Equation (4) being able to be used to compare the compensated pressure with a plurality of underinflation thresholds. It should be noted that a puncture may be likened to an underinflation.

Under these conditions, the calculating means (7) are of course designed to implement the equations presented above.

An alarm may also be provided, which emits a signal controlled by the compensated pressure, whether a leak is detected or whether underinflation is detected.

The invention claimed is:

1. A device for detecting a leak in a tire of a motor vehicle wheel, comprising:
   means for measuring the pressure of the gas contained in the tire;
   means for collecting pressure measurement data;
   means for calculating a change in pressure between two instants of measurement data collection; and
   means for clocking the collection of the pressure measurement data and computing the intervals separating the clocked instants of collection to deduct therefrom the corresponding pressure deviations between the clocked instants of collection.

2. A device according to claim 1, further including means for calculating clocking differences between successive measurement data.

3. A device according to claim 2, wherein the data collection means is configured to transmit a signal for interrupting the clocking means in order to record in a memory the instant of receipt of the measurement data.

4. A device according to claim 1, further including means for measuring the temperature of the gas contained in the tire, wherein the data collection means is further configured to collect the temperature measurement and the calculating means is further configured to temperature-compensate the pressure measurement.

5. A device according to claim 4, in which the calculating means is configured to establish the equation:

$$P_c = (P_m + 1.014)\frac{T_{ref}}{T_m} - 1.014$$

in which $P_c$ and $P_m$ are relative pressures and the temperatures $T_{ref}$ and $T_m$ are expressed in Kelvin.

6. A device according to claim 4, further including means for transmitting an alarm signal based on the compensated pressure.

* * * * *